(12) United States Patent
Ochiai et al.

(10) Patent No.: US 10,658,667 B2
(45) Date of Patent: May 19, 2020

(54) CONDUCTIVE AUXILIARY AGENT, ELECTRODE MATERIAL FOR BATTERY, AND METHOD FOR MANUFACTURING ELECTRODE MATERIAL FOR BATTERY

(71) Applicant: FDK CORPORATION, Tokyo (JP)

(72) Inventors: Yuki Ochiai, Tokyo (JP); Naoaki Nishimura, Tokyo (JP); Daisuke Hirata, Tokyo (JP); Keita Yamamoto, Tokyo (JP)

(73) Assignee: FDK CORPORATION, Tokyo (JP)

( * ) Notice: Subject to any disclaimer, the term of this patent is extended or adjusted under 35 U.S.C. 154(b) by 28 days.

(21) Appl. No.: 15/939,276

(22) Filed: Mar. 29, 2018

(65) Prior Publication Data
US 2018/0287159 A1 Oct. 4, 2018

(30) Foreign Application Priority Data
Mar. 29, 2017 (JP) .................. 2017-064412

(51) Int. Cl.
| | |
|---|---|
| H01M 4/62 | (2006.01) |
| B01F 7/16 | (2006.01) |
| H01M 10/0525 | (2010.01) |
| C09C 1/48 | (2006.01) |
| H01M 2/16 | (2006.01) |
| H01M 4/131 | (2010.01) |
| H04B 1/22 | (2006.01) |
| H01M 4/505 | (2010.01) |
| H01M 10/052 | (2010.01) |

(52) U.S. Cl.
CPC ............ *H01M 4/625* (2013.01); *B01F 7/16* (2013.01); *C09C 1/48* (2013.01); *H01M 2/1653* (2013.01); *H01M 4/131* (2013.01); *H01M 10/0525* (2013.01); *H04B 1/22* (2013.01); *C01P 2006/22* (2013.01); *C01P 2006/40* (2013.01); *H01M 4/505* (2013.01); *H01M 4/621* (2013.01); *H01M 10/052* (2013.01)

(58) Field of Classification Search
None
See application file for complete search history.

(56) References Cited

U.S. PATENT DOCUMENTS

| | | | | |
|---|---|---|---|---|
| 2010/0304270 | A1* | 12/2010 | Amin-Sanayei | H01M 4/0404 429/483 |
| 2015/0311533 | A1* | 10/2015 | Tachibana | H01M 4/04 429/232 |

OTHER PUBLICATIONS

Tetsuya Wada, "Carbon-Material Design for Conductive Material in Rechargeable Batteries", The Micromeritics, Hosokawa Micron Corporation, No. 55(2012), pp. 58-62, searched on Mar. 7, 2017, Japanese Website:<https://www.hosokawamicron.co.jp/jp/service/micromeritics/no_55/pdf/No55_10.pdf>.

(Continued)

*Primary Examiner* — Wyatt P McConnell
(74) *Attorney, Agent, or Firm* — Isshiki International Law Office; Joseph P. Farrar, Esq.

(57) ABSTRACT

A conductive auxiliary agent for an electrode slurry for a battery. The electrode slurry contains an electrode active material and a conductive auxiliary agent, and is applied to a sheet-shaped current collector. The conductive auxiliary agent is a carbon paste produced by dispersing a carbon powder in a solvent. The carbon paste has a viscosity of at least 20 Pa·s and not more than 40 Pa·s. The carbon material can be acetylene black.

3 Claims, 5 Drawing Sheets

(56) References Cited

OTHER PUBLICATIONS

FDK Corporation, "Thin Type Primary Lithium Batteries", searched on Mar. 7, 2017, Japanese Website: <http://www.fdk.co.jp/battery/lithium/lithium_thin.html>; English Website: <http://www.fdk.com/battery/lithium_e/lithium_thin.html>.

* cited by examiner

CONDUCTIVE AUXILIARY AGENT, ELECTRODE MATERIAL FOR BATTERY, AND METHOD FOR MANUFACTURING ELECTRODE MATERIAL FOR BATTERY

CROSS-REFERENCE TO RELATED APPLICATIONS

This application is based on and claims priority under 35 U.S.C. § 119 to Japanese Patent Application No. 2017-064412, filed on Mar. 29, 2017, the entire contents of which are incorporated herein by reference.

TECHNICAL FIELD

This disclosure relates to conductive auxiliary agents, electrode materials for a battery, and a method for manufacturing electrode material for a battery.

BACKGROUND ART

For forming battery electrodes, for example, the positive electrode of a spiral-type lithium primary battery or a laminate-type lithium primary battery and the like, an electrode slurry is used. The electrode slurry is manufactured by kneading a mixture produced by mixing a powdery electrode active material, a conductive auxiliary agent, a binder, and as necessary a viscosity improver or similar substance while applying shear stress to the mixture using a planetary mixer or the like. A carbon powder such as graphite or carbon black is generally used as the conductive auxiliary agent. In some cases, a microscopically fibrous carbon material such as a carbon nanofiber (CNF) is used as the carbon powder. In either case, the carbon powder is generally used as the conductive auxiliary agent.

"Carbon-Material Design for Conductive Material in Rechargeable Batteries", a back number of "THE MICROMERITICS", No. 55 (2012), pages 58 to 62, Hosokawa Micron Corporation, [online search Mar. 7, 2017]), <URL: https://www.hosokawamicron.co.jp/jp/service/micromeritics/no_55/pdf/No55_10.pdf> describes carbon powder added to slurry as a conductive auxiliary agent. Additionally, "Thin Type Primary Lithium Batteries", FDK Corporation, [online search Mar. 7, 2017]), <URL: http://www.fdk.co.jp/battery/lithium/lithium_thin.html> provides specifications and other explanations of thin type primary lithium batteries, which are actually commercially available laminate-type storage elements.

The electrode slurry is produced by adding and kneading the binder to the powdery electrode active material and the conductive auxiliary agent. To produce an electrode plate, the electrode slurry is applied over a sheet-shaped current collector using a squeegee or similar tool.

The carbon powder used as the conductive auxiliary agent is likely to aggregate and the carbon powder is difficult to be uniformly dispersed in the electrode slurry. In the case where the conductive auxiliary agent aggregates, when the electrode material is applied over the current collector to manufacture the electrode plate, lumps of the aggregated conductive auxiliary agent (hereinafter also referred to as aggregates) possibly generate unevenness in the surface of the electrode plate. That is, the aggregates cause the formation of projections on the surface of the electrode plate. Meanwhile, in the case where the electrode material is applied over the current collector with a squeegee, when the aggregates are raked over by the squeegee and the electrode material is spread out, marks remain as recesses in the surface of the electrode plate. An uneven surface of the electrode plate can degrade the battery and cause unwanted variation in battery characteristics. Additionally, there is a possibility that the projections on the surface of the electrode plate may damage a separator, possibly resulting in an internal short-circuit.

SUMMARY

In one aspect of this disclosure, an improved conductive auxiliary agent for an electrode slurry for a battery, the electrode slurry containing an electrode active material and a conductive auxiliary agent and applied to a sheet-shaped current collector, wherein the conductive auxiliary agent is a carbon paste produced by dispersing carbon powder in a solvent, and the carbon paste has a viscosity of at least 20 Pa·s and not more than 40 Pa·s.

In the conductive auxiliary agent, the carbon material may be acetylene black.

In another aspect of this disclosure, an electrode slurry for a battery contains an electrode active material and a conductive auxiliary agent, and the electrode slurry is applied to a flat planar current collector. The conductive auxiliary agent is a carbon paste with viscosity of at least 20 Pa·s and not more than 40 Pa·s, the carbon paste being produced by dispersing a carbon powder in a solvent.

In yet another aspect of this disclosure, a method for manufacturing electrode slurry for a battery containing a mixture containing an electrode active material, a conductive auxiliary agent, and a binder includes: using a carbon paste as the conductive auxiliary agent, the carbon paste being produced by dispersing carbon powder in a solvent; and kneading the electrode active material, the conductive auxiliary agent, and the binder in a solvent.

Preferably, the carbon paste has a viscosity of at least 20 Pa·s and not more than 40 Pa·s.

BRIEF DESCRIPTION OF THE DRAWINGS

For a more complete understanding of the present disclosure and the advantages thereof, reference is now made to the following description taken in conjunction with the accompanying drawings wherein.

DESCRIPTION OF EMBODIMENTS

Figure 1A:
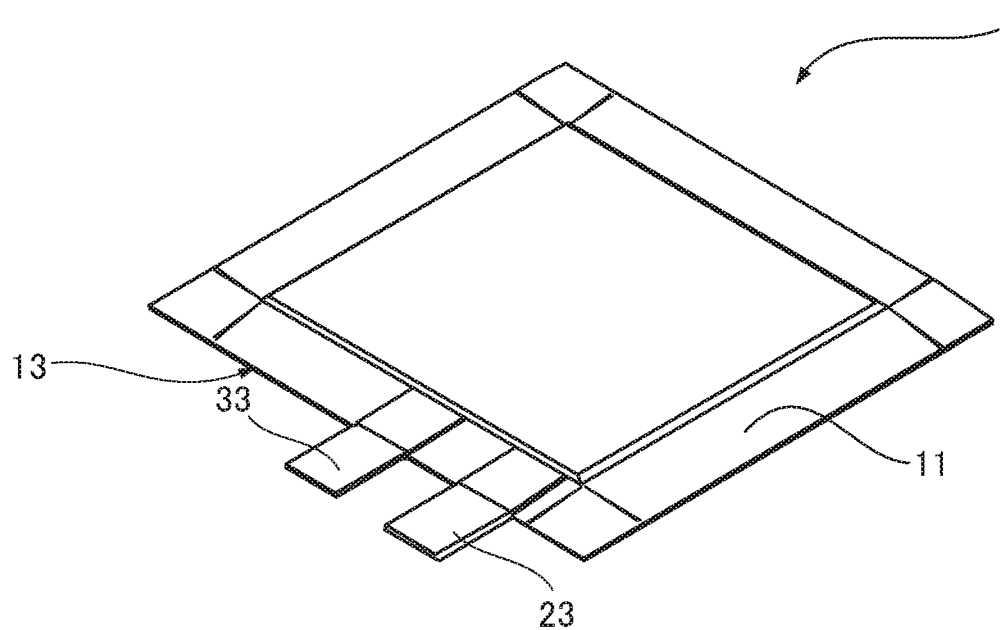
FIG. 1A illustrates a structure of a laminate-type storage element.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes embodiments of this disclosure with reference to the attached drawings. Like reference numerals designate identical or similar parts in the drawings used for the following description, and therefore such elements will not be further elaborated. In some drawings, unnecessary reference numerals may be omitted in the description.

Referring now to the drawings, wherein like reference numerals designate identical or corresponding parts throughout the several views thereof, a conductive auxiliary agent, an electrode material for a battery, and a method for manufacturing electrode material for a battery according to embodiments of the present disclosure are described. As used herein, the singular forms "a", "an", and "the" are intended to include the plural forms as well, unless the context clearly indicates otherwise.

Laminate-Type Storage Element

Figure 1B:
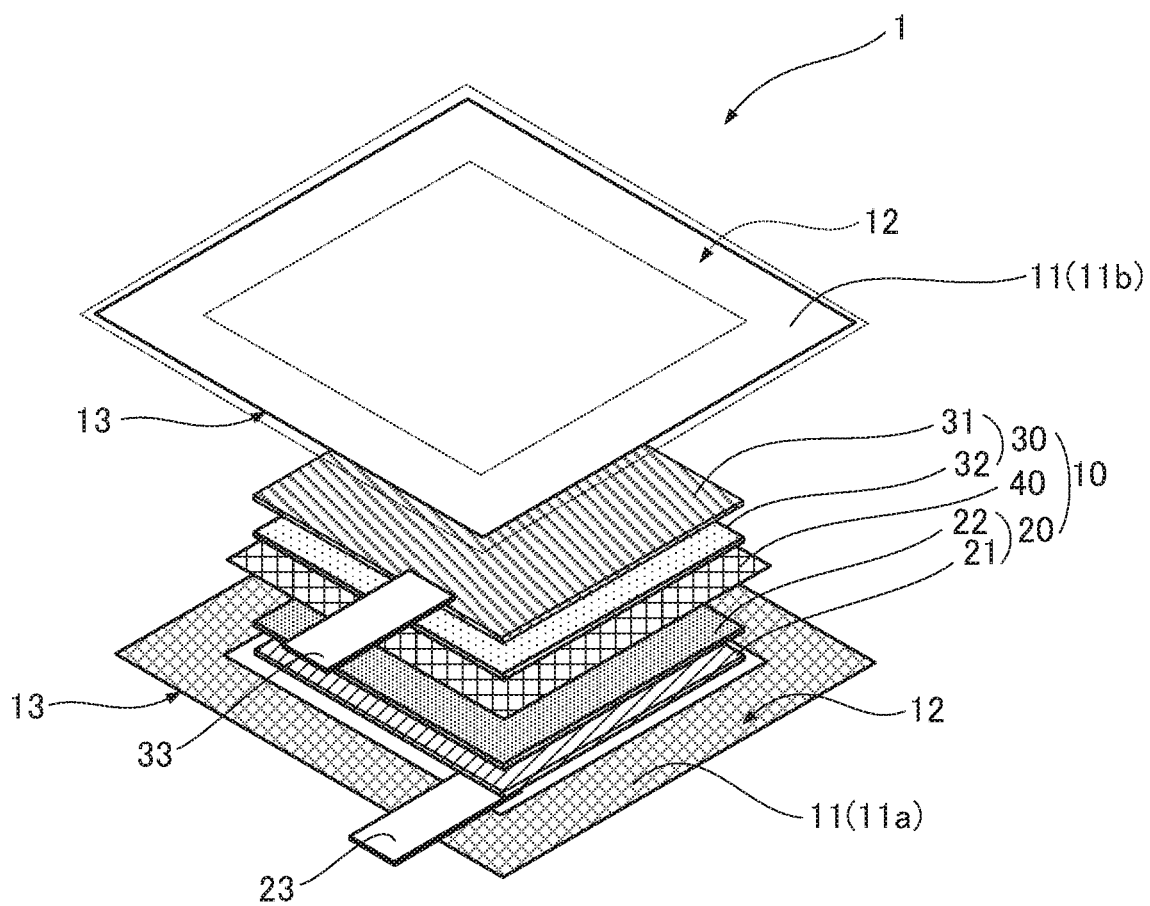
FIG. 1B is an exploded view of the structure of the laminate-type storage element.

FIG. 1A and FIG. 1B illustrate a laminate-type storage element as one example of a battery manufactured using an electrode slurry. FIG. 1A is an external view of a laminate-type storage element 1. FIG. 1B is an exploded perspective view illustrating the internal structure of the laminate-type storage element 1. As illustrated in FIG. 1A and FIG. 1B, the laminate-type storage element 1 has a flat planar external shape. An exterior body 11 shaped into a flat rectangular bag using two laminate films 11a and 11b seals a power generating element inside. The laminate-type storage element 1 illustrated in FIG. 1A and FIG. 1B includes a positive electrode terminal plate 23 and a negative electrode terminal plate 33 led outside from one side 13 of the rectangular exterior body 11.

Next, the following describes a structure of the laminate-type storage element 1 with reference to FIG. 1B. FIG. 1B uses hatching for some members and sections to distinguish them from other members and sections. As illustrated in FIG. 1B, the exterior body 11 is configured by welding together peripheral edge regions 12, which are hatched or indicated by the dotted line frame in FIG. 1B, of the two rectangular aluminum laminate films 11a, 11b stacked one atop another, by thermos-compression bonding to seal the inside.

The exterior body 11 internally seals an electrode body 10 together with an electrolyte. The electrode body 10 is formed by laminating a sheet-shaped positive electrode plate 20 and a sheet-shaped negative electrode plate 30 via a separator 40. The positive electrode plate 20 is formed by applying and drying a positive electrode slurry 22 containing a positive-electrode active material over a principal surface of a sheet-shaped positive electrode current collector 21 made of metal foil or a similar material. The positive electrode terminal plate 23 is connected to the positive electrode current collector 21, one end portion of the positive electrode terminal plate 23 is exposed outside the exterior body 11, and the other end portion is connected to a part of the positive electrode current collector 21 by a method such as ultrasonic welding. The positive electrode material 22 is applied to a surface of the positive electrode current collector 21 on a side disposed opposite the separator 40. As long as the laminate-type storage element 1 is a primary lithium battery, manganese dioxide or a similar substance may be used as the positive-electrode active material.

The negative electrode plate 30 is formed by disposing a negative electrode material 32 containing a negative-electrode active material over a principal surface of a sheet-shaped negative electrode current collector 31 made of a metal plate, metal foil, or a similar material. The negative electrode terminal plate 33 is connected to the negative electrode current collector 31, and one end portion of the negative electrode terminal plate 33 is exposed outside the exterior body 11. The negative electrode material 32 may be formed by applying and drying a slurry material containing the negative-electrode active material to the negative electrode current collector 31. As long as the laminate-type storage element 1 is a primary lithium battery, the negative electrode material 32 may be the negative-electrode active material itself made of metallic lithium or lithium metal. The positive electrode material 22 of the positive electrode plate 20 is disposed opposite the negative electrode material 32 of the negative electrode plate 30 via the separator 40. Thus, the laminate-type storage element 1 includes the electrode plates (positive electrode plate 20, negative electrode plate 30) formed by applying the electrode slurry (positive electrode material 22, negative electrode material 32) over the respective sheet-shaped current collectors (positive electrode current collector 21, negative electrode current collector 31) made of metal foil or metal plate.

Electrode Material

The electrode material is manufactured by kneading a mixture produced by adding an electrode active material, a conductive auxiliary agent, a binder, and a viscosity improver or similar substance. The method for manufacturing electrode material according to the embodiment of this disclosure involves first manufacturing a conductive auxiliary agent paste (hereinafter also referred to as carbon paste) containing a carbon material, and mixes the carbon paste as the conductive auxiliary agent into an electrode active material powder together with the binder. Accordingly, the degree of aggregation can be controlled by the viscosity of the carbon paste. Thus, even in the case where the electrode slurry is manufactured using carbon paste as the conductive auxiliary agent, the carbon materials are not aggregated further. With the conductive auxiliary agent according to the embodiment of this disclosure, viscosity is set to an appropriate value to ensure aggregation suppression.

Carbon Paste

First, in order to examine the conditions under which aggregation of the carbon material in the carbon paste is suppressed, various carbon pastes with different solid contents (wt %) were manufactured as samples using pure water as a dispersion medium. Specifically, acetylene black was used as the carbon powder and various carbon pastes with different solid contents were manufactured as the samples and the degree of aggregation in each sample was measured with a grind gauge. Here, each sample was examined for a relation between the solid content (wt %) of the mixed carbon paste, the various kinds of marks (linear mark, granular mark) generated on the grind gauge in association with the aggregation, and the locations on the scale of the grind gauge at which the marks appeared. The positions at which the linear marks and the granular marks were generated were specified based on Japanese Industrial Standards (JIS) (JIS K5101). A position where at least three lines of 1 cm or more were generated was considered a linear mark, and a position where five to ten points were generated in a 3 mm-width strip was considered a granular mark.

Table 1 shows the degree of aggregation of each sample using the grind gauge.

TABLE 1

| SAMPLE | SOLID CONTENT (wt %) | GRANULAR GAUGE MARK | GRANULAR GAUGE MARK POSITION (μm) |
|---|---|---|---|
| 1 | 15 | LINEAR | 20 |
| 2 | 16 | LINEAR | 20 |
| 3 | 17 | LINEAR | 20 |
| 4 | 18 | LINEAR | 18 |
| 5 | 19 | LINEAR | 13 |
| 6 | 20 | NONE | — |
| 7 | 21 | NONE | — |
| 8 | 22 | NONE | — |
| 9 | 23 | NONE | — |
| 10 | 24 | LINEAR • GRANULAR | 8 |
| 11 | 25 | GRANULAR | 15 |

As shown in Table 1, the aggregation did not occur in samples 6 to 9 with carbon paste solid contents of 20 to 23%. Lesser solid content generated linear marks, and greater solid content generated granular marks.

The solid content of the carbon paste is used to adjust the viscosity and thus increasing the solid content ensures increasing the viscosity. Of course, addition of a viscosity improver can increase the viscosity even with a low solid content. However, in this experiment, to accurately identify the viscosity of the carbon paste at which the carbon material is less likely to aggregate, the viscosity was adjusted by changing only the solid content of the carbon paste.

The actual electrode slurry was manufactured by kneading a mixture containing an electrode active material, a conductive auxiliary agent, and a binder in a solvent (such as N-methyl-2-pyrrolidone (NMP)) using a planetary mixer or a similar mixer while applying shear stress to the mixture. Then, the viscosity of each sample was measured using a rheometer, and the correlation between the solid content at which the specified aggregation did not occur and the viscosity was examined using the grind gauge.

Figure 2:
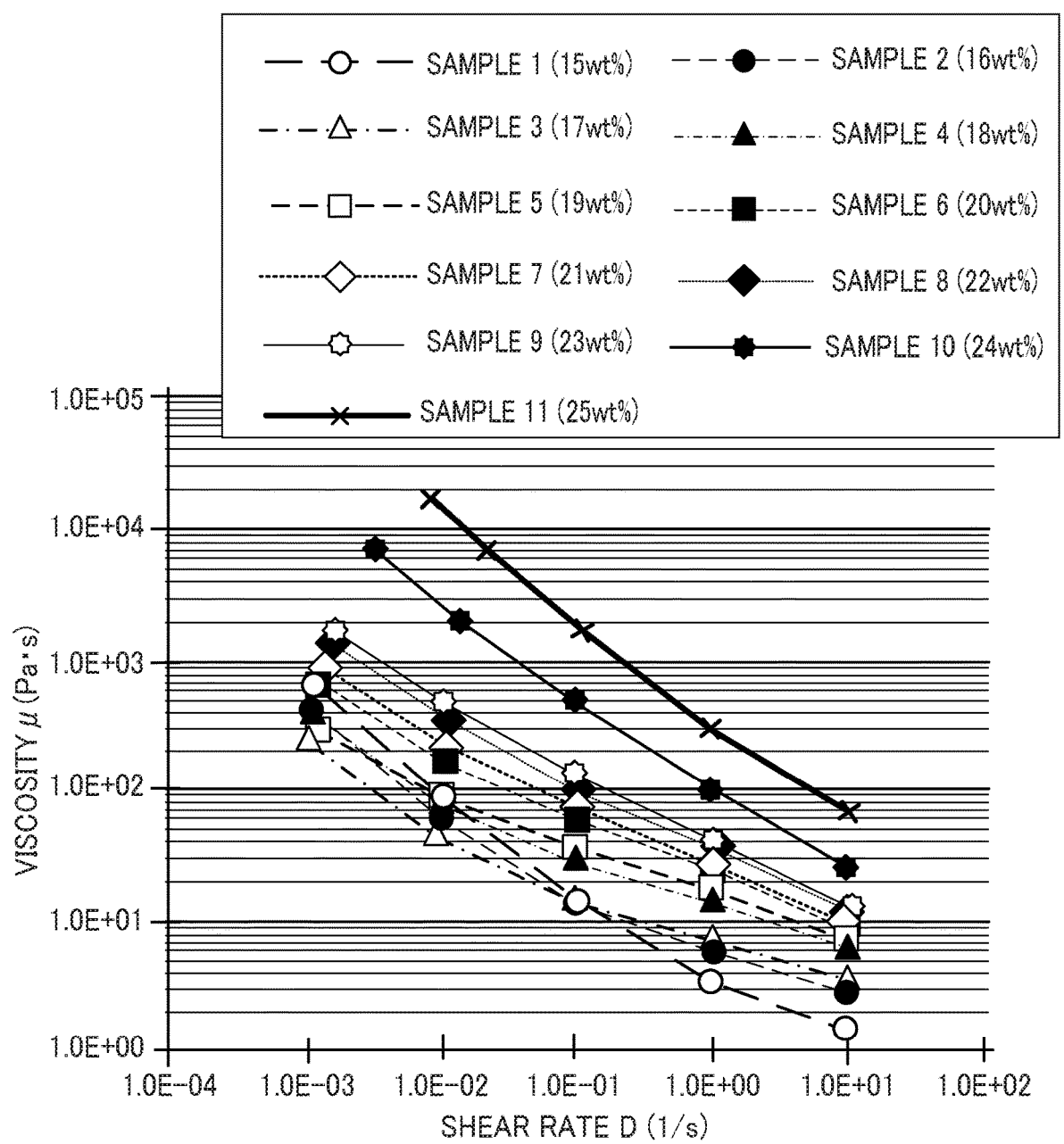
FIG. 2 illustrates a relation between a shear rate D and viscosity of various carbon pastes with different solid contents.

Table 2 shows static viscosity of each sample. FIG. 2 illustrates dynamic viscosity of each sample.

TABLE 2

| SAMPLE | SOLID CONTENT (wt %) | GRANULAR GAUGE MARK | VISCOSITY (Pa · s) |
|---|---|---|---|
| 1 | 15 | LINEAR | 3.5 |
| 2 | 16 | LINEAR | 6.1 |
| 3 | 17 | LINEAR | 7.3 |
| 4 | 18 | LINEAR | 14.1 |
| 5 | 19 | LINEAR | 17.2 |
| 6 | 20 | NONE | 25.6 |
| 7 | 21 | NONE | 28.0 |
| 8 | 22 | NONE | 39.7 |
| 9 | 23 | NONE | 42.2 |
| 10 | 24 | LINEAR • GRANULAR | 103.1 |
| 11 | 25 | GRANULAR | 295.3 |

The viscosity shown in Table 2 is viscosity at a predetermined shear rate (for example, D=1 (1/sec)). FIG. 2 is a graph illustrating a relation between a shear rate D (1/sec) and the viscosity (Pa·s) in each sample in which the horizontal axis and the vertical axis employ logarithmic scales. As illustrated in FIG. 2, all samples 1 to 11 exhibit lowered viscosity as the shear rate D increases. Samples 6 to 9, where the aggregation did not occur in the measurement with the grind gauge, exhibit increased viscosity of the carbon paste as the solid content increases, that is, as the water content of the carbon paste decreases regardless of the shear rate D. Furthermore, for samples 6 to 9, the gradients of the graphed curves indicative of the relation between the shear rate D and the viscosity is gentler than those of the other samples (1 to 5 and 10, 11). With the samples 1 to 5, 10, and 11, the gradient of the curve increases and the TI (thixotropic index) value increases the more the solid contents deviate from those of samples 6 to 9.

Figure 3:
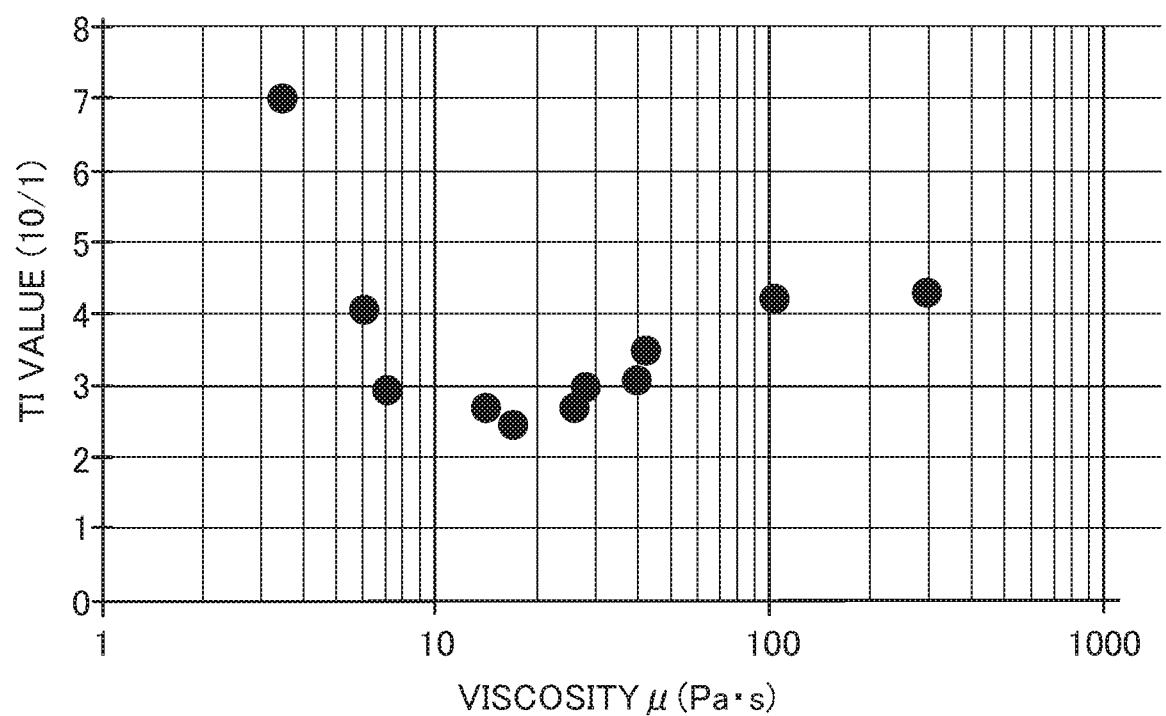
FIG. 3 illustrates a relation between the viscosity and a TI value of the various carbon pastes.

Next, based on FIG. 2, the TI value (10/1) of each sample was obtained from the viscosity with a shear rate D of 0.1 (1/sec) and D=1 (1/sec). FIG. 3 illustrates the relation between the viscosity and the TI value, with the viscosity on the horizontal axis and the TI value on the vertical axis, and the horizontal axis being a logarithmic scale. The TI value is an index indicative of the degree of aggregation as well, and the TI value increases as aggregating property increases. For example, when kneading the carbon paste at the slow shear rate D, the aggregates are not picked apart and resistance increases. That is, the viscosity increases. By contrast, kneading at the fast shear rate D moves the aggregates, exhibiting high fluidity. That is, the viscosity declines. The TI value thus serves as an index indicative of ease of change in viscosity according to the shear rate D. The lower the TI value is, the easier the aggregates come apart, indicating uniform dispersion of the aggregates.

With reference to the results shown in Table 1, it can be seen that aggregation does not occur with a solid content of 20 wt % to 23 wt %. With reference to the results illustrated in FIG. 2, a numerical range of the viscosity corresponding to these solid contents becomes around 20 Pa·s to 40 Pa·s. The results illustrated in FIG. 3 also show that the TI value becomes 2.5 to 3.5 in the aforementioned numerical range of viscosity, with the TI values becoming large before and after this numerical range and indicating that aggregates remain.

Coating

As described above, the presence or absence of aggregation and the positions where the linear mark and the granular mark were generated in association with the aggregation were measured using a grind gauge for various samples having different solid contents of acetylene black in the carbon paste. Further, the dynamic viscosity of the various samples was examined with a rheometer. It was found that aggregation is less likely to occur as long as the carbon paste has a viscosity of 20 Pa·s to 40 Pa·s. However, even when the carbon paste having a viscosity in the range where aggregation is less likely to occur is included in electrode material as a conductive auxiliary agent, when the electrode material is applied over the current collector to produce the electrode plate and unevenness appears in the surface of the electrode plate, properties of batteries using this electrode plate will undesirably vary from one battery to the next. Alternatively, the battery may experience an internal short-circuit due to damage to the separator. For this reason, the above-described samples were each applied to a surface of stainless steel foil with a squeegee and surface roughness of the coated surface was measured with a laser microscope.

Figure 4:
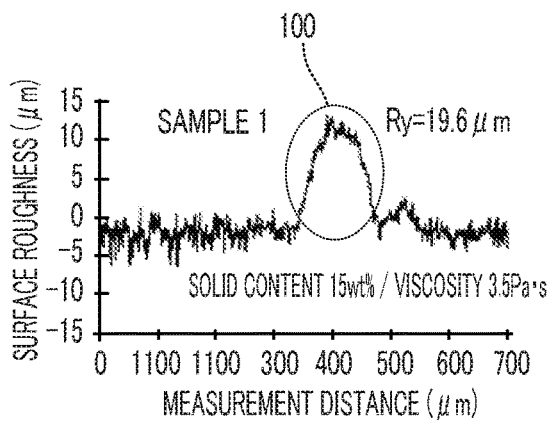
FIG. 4 illustrates surface roughness on coated surfaces of the various carbon pastes.
Figure 4:
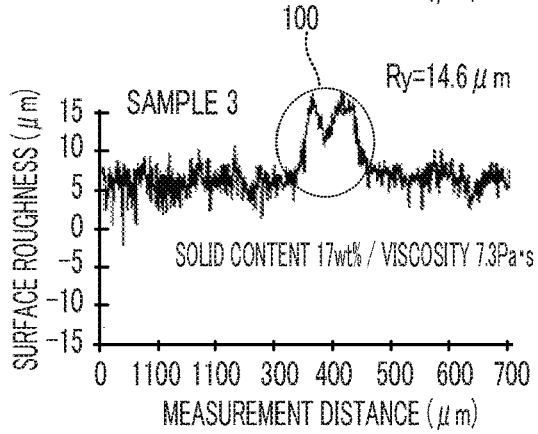
Figure 4:
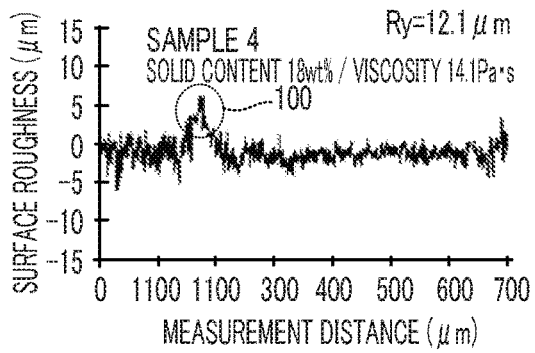
Figure 4:
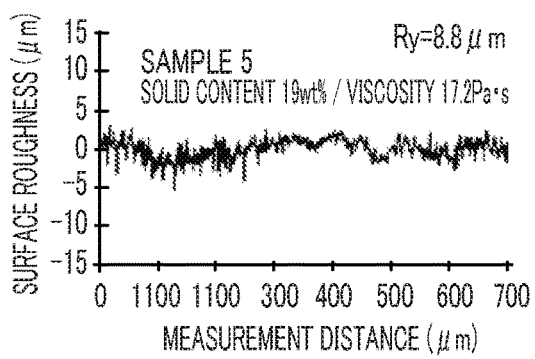
Figure 4:
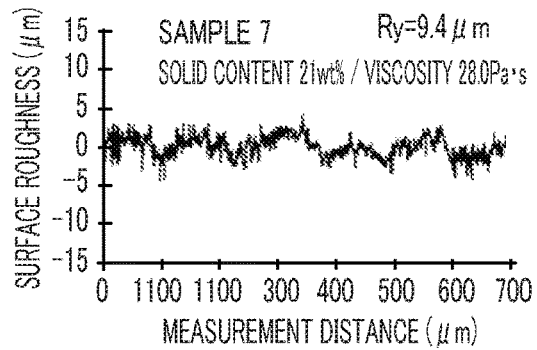
Figure 4:
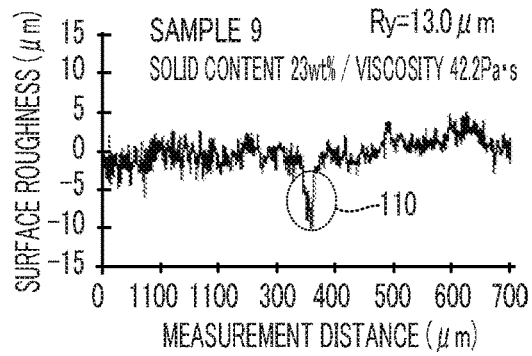
Figure 4:
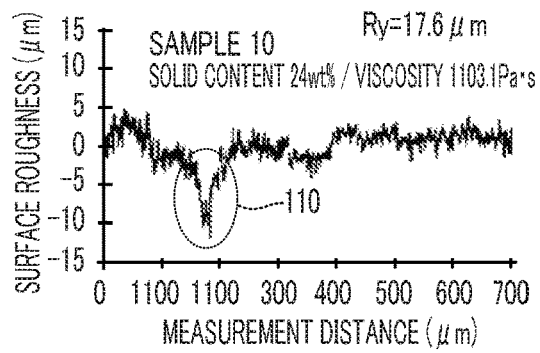
Figure 4:
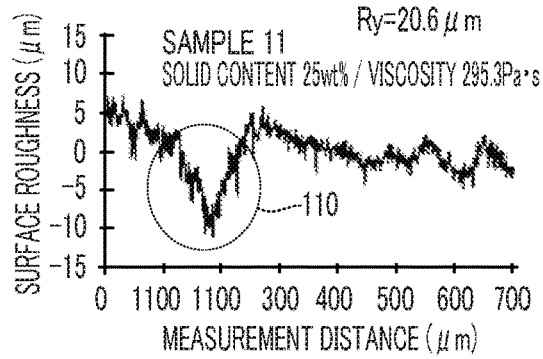

FIG. 4 illustrates measurement results of the coated surfaces of some of the samples shown in Table 1 using the laser microscope. FIG. 4 illustrates a maximum height roughness (hereinafter also referred to as surface roughness Ry (unit: μm)). The maximum height roughness is a difference (in μm) between a lowest point and a highest point on the coated surface obtained from the solid content (wt %), the viscosity (Pa·s), and the measurement result using the laser microscope for each sample. As illustrated in FIG. 4, the samples 1, 3, and 4, in which the solid contents are equal to or smaller than 18 wt % and the viscosities are equal to or smaller than 14.2 Pa·s, generate projections 100 possibly caused by adhesion of the aggregate to apart of the coated surface. The height of the projection 100 decreases as the viscosity increases. In sample 4, the projection 100 is considerably lower than those of samples 1 and 3.

Figure 5:
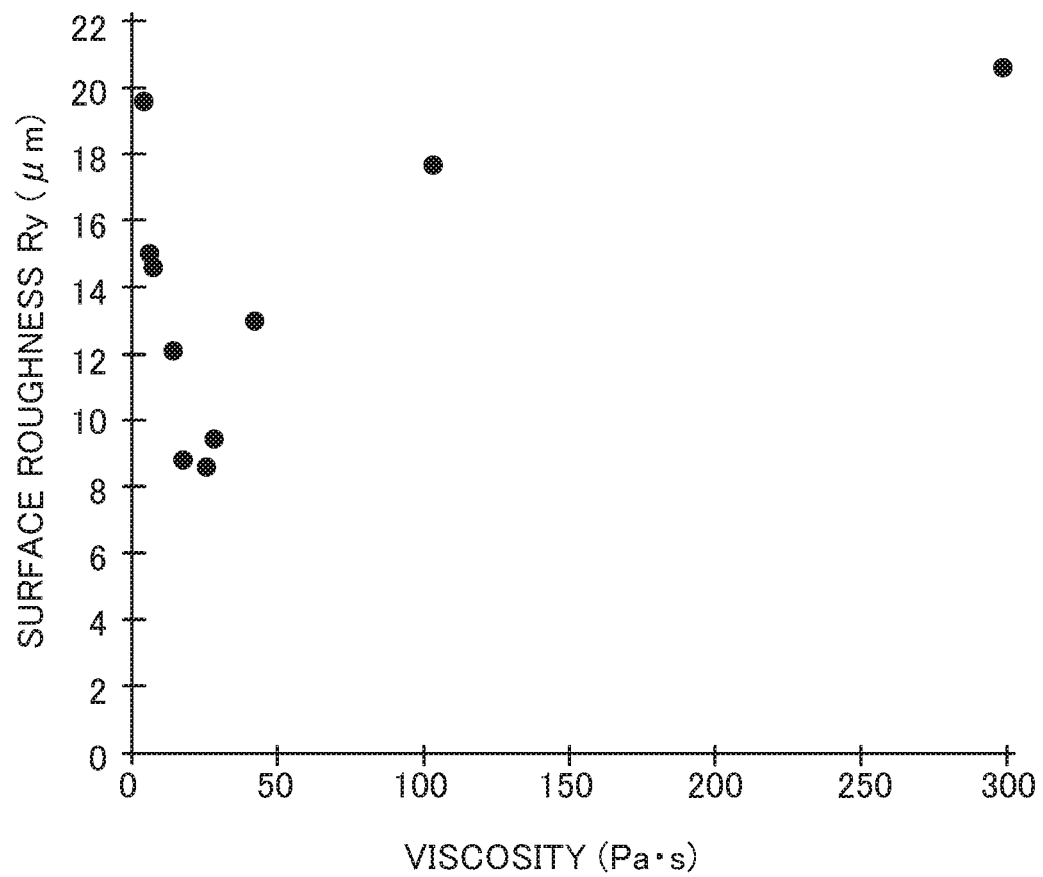
FIG. 5 illustrates a relation between the viscosity and the surface roughness on the coated surfaces of the various carbon pastes.

Although aggregation was confirmed in sample 5, with a solid content of 19 wt % and a viscosity of 17.2 Pa·s, as measured by the grind gauge at the 13 μm-position, the coated surface was flat. With reference to the results shown in Table 1 and Table 2, sample 7, which did not produce any aggregation (solid content 21 wt %, viscosity 28 Pa·s) has a flat coated surface. Sample 9, with a solid content of 23 wt % that did not produce aggregation as measured by the grind gauge, had a viscosity of 42.2 Pa·s, and the presence of a slight recess 110 on the coated surface was confirmed. Sample 10, with a solid content of 24 wt % and a viscosity of 103 Pa·s, and sample 11, with a solid content of 25 wt % and a viscosity of 295 Pa·s, exhibit a large recess 110 on the coated surface. As is also apparent from FIG. 5, which graphs the relation between the viscosity and the surface roughness Ry, it can be confirmed that the surface roughness Ry decreases in a viscosity range of 20 Pa·s to 40 Pa·s and large unevenness does not appear in the coated surfaces.

As illustrated in FIG. 4, it was confirmed that the unevenness in the coated surface can be reduced with a viscosity of at least 20 Pa·s and not more than 40 Pa·s, which corresponds to the solid contents of samples 6 to 9 where aggregation did not occur in Table 1 and Table 2 as described above. Accordingly, as long as the electrode plate is manufactured by applying the electrode slurry containing carbon paste with a viscosity of at least 20 Pa·s and not more than 40 Pa·s as the conductive auxiliary agent to the current collector, aggregation of the carbon material, which will be the main cause of unevenness in the coated surface, is suppressed. Thus, unevenness is less likely to appear also in the surface of the electrode plate.

A procedure to manufacture the electrode slurry containing carbon paste with a viscosity of at least 20 Pa·s and not more than 40 Pa·s as the conductive auxiliary agent is nearly identical to a procedure to manufacture electrode material containing carbon powder as the conductive auxiliary agent. For example, to manufacture the positive electrode material of the thin type primary lithium battery described in "Thin Type Primary Lithium Batteries", FDK Corporation, [online search Mar. 7, 2017]), <URL: http://www.fdk.co.jp/battery/lithium/lithium_thin.html>, the electrode slurry can be manufactured as follows: Electrolytic Manganese Dioxides (EMD) as a positive-electrode active material, carbon paste according to the embodiment of this disclosure as the conductive auxiliary agent, that is, carbon paste with a viscosity of at least 20 Pa·s and not more than 40 Pa·s, and a well-known binder such as polyvinylidene fluoride are mixed in proportions of, for example, 93 wt %, 3 wt %, and 4 wt %, respectively, and the mixture is kneaded using N-Methyl-2-pyrrolidone (NMP).

Other Embodiments

While the conductive auxiliary agent according to the above embodiment is carbon paste with a viscosity of at least 20 Pas and not more than 40 Pas and the viscosity in this numerical range is regulated by the proportion of the solid content, the viscosity may be regulated by the additive amount of a viscosity improver.

The conductive auxiliary agent according to the embodiment of this disclosure is applicable to not only a laminate-type storage element and a spiral-type lithium primary battery but also a battery including an electrode plate formed by applying an electrode slurry to a sheet-shaped current collector such as a metal foil, regardless of whether the battery is a primary battery or a secondary battery. Obviously, the electrode slurry is also applicable to the negative electrode.

While the embodiment uses acetylene black, which is especially likely to aggregate, as the carbon powder, alternatively carbon black such as acetylene black and Ketjen black, graphite, CNF, or a similar substance may be used as the carbon powder contained in the carbon paste according to the embodiment of this disclosure.

The above-described embodiments are intended to facilitate and understanding of the present disclosure and are not in any way to be construed as limiting the present disclosure. The present disclosure may be modified and improved without departing from the scope of the disclosure, and equivalents thereof are also encompassed by the disclosure.

What is claimed is:

1. A conductive auxiliary agent for an electrode slurry for a battery, the electrode slurry containing an electrode active material and the conductive auxiliary agent and applied to a sheet-shaped current collector, wherein
   the conductive auxiliary agent is a carbon paste produced by dispersing a carbon powder in water, and
   the carbon paste is 20 wt % to 23 wt % acetylene black and has a dynamic viscosity of at least 20 Pa·s and not more than 40 Pa·s at a predetermined shear rate D (1/sec).

2. An electrode slurry for a battery containing an electrode active material and a conductive auxiliary agent, the electrode slurry for a battery applied to a flat planar current collector,
   wherein the conductive auxiliary agent is a carbon paste with a dynamic viscosity of at least 20 Pa·s and not more than 40 Pa·s at a predetermined shear rate D (1/sec), the carbon paste being produced by dispersing a carbon powder in water, and
   the carbon paste is 20 wt % to 23 wt % acetylene black.

3. A method for manufacturing an electrode plate for a battery having a planar metallic current collector, the method comprising:
   preparing an electrode slurry for a battery containing a mixture containing an electrode active material, a conductive auxiliary agent, and a binder,
   wherein the conductive auxiliary agent is a carbon paste produced by dispersing a carbon powder in water;
   using a mixer, kneading the electrode active material, the conductive auxiliary agent, and the binder in N-Methyl-2-pyrrolidone (NMP); and
   using a squeegee, applying the electrode slurry to a surface of the current collector,
   wherein the carbon paste is 20 wt % to 23 wt % acetylene black and has a dynamic viscosity of at least 20 Pa·s and not more than 40 Pa·s at a predetermined shear rate D (1/sec) as measured using a rheometer.

* * * * *